DAVID NORMAN WILLIAM BADCOCK.
INVENTOR

July 22, 1969  D. N. W. BADCOCK  3,457,438
DOUBLE INSULATED HAND TOOL WITH INSULATING SHAFT COUPLINGS
Filed April 22, 1968  2 Sheets-Sheet 2

DAVID NORMAN WILLIAM BADCOCK,
INVENTOR

By Wenderoth, Lind & Ponack.
attys

United States Patent Office 3,457,438
Patented July 22, 1969

3,457,438
DOUBLE INSULATED HAND TOOL WITH INSULATING SHAFT COUPLINGS
David Norman William Badcock, Streatham, London, England, assignor to Kango Electric Hammers Limited, London, England, a British company
Filed Apr. 22, 1968, Ser. No. 723,206
Claims priority, application Great Britain, Apr. 24, 1967, 18,868/67
Int. Cl. H02k 7/14
U.S. Cl. 310—50         10 Claims

ABSTRACT OF THE DISCLOSURE

An electric motor with double insulation, particularly for portable power tools, has on its output shaft a coupling comprising a first element fixedly secured on one end of said shaft and a second element disposed coaxially with the first element and spaced therefrom, one of which elements has a sleeve portion encircling at least part of the axial length of the other element, and a third element which is made from an electrically insulating material and fills the gaps between the first and second elements and which is adapted to transmit a rotary drive from the first element to the second element whilst insulating the first and second elements electrically from each other.

---

This invention relates to electric motors and has a particularly useful but not exclusive application in portable tools powered by an electric motor since it permits construction having or requiring electrically conductive exterior components in direct electrical contact with the bearings of the output shaft of the motor to meet the requirements for double electrical insulation of such tools using a motor which has only a single insulated output shaft.

According to this invention there is provided an electric motor having on the output shaft thereof a coupling comprising a first element fixedly secured on one end of said shaft and a second element disposed coaxially with the first element and spaced therefrom, one of which elements has a sleeve portion encircling at least part of the axial length of the other element, and a third element which is made from an electrically insulating material and fills gaps between the first and second elements and which is adapted to transmit a rotary drive from the first element to the second element whilst insulating the first and second elements electrically from each other.

Normally, those radially-facing surfaces of the first and second elements which engage the third element are other than smoothly and continuously cylindrical, i.e. are formed with proturberances and/or depressions and/or holes, for improving the torque-transmitting capacity of the coupling. For example, the sleeve may have holes extending radially therethrough which are filled by the material of the third element, and the external surface of the element or element part encircled by the sleeve portion may be knurled.

Preferably the third element extends round the whole of the radially outer surface of the sleeve portion.

The invention also provides a portable electrically driven power tool comprising a main housing carrying a tool holder and enclosing an electric motor as set forth in the second paragraph of this statement, the motor driving the tool holder through the coupling.

Figure 1:
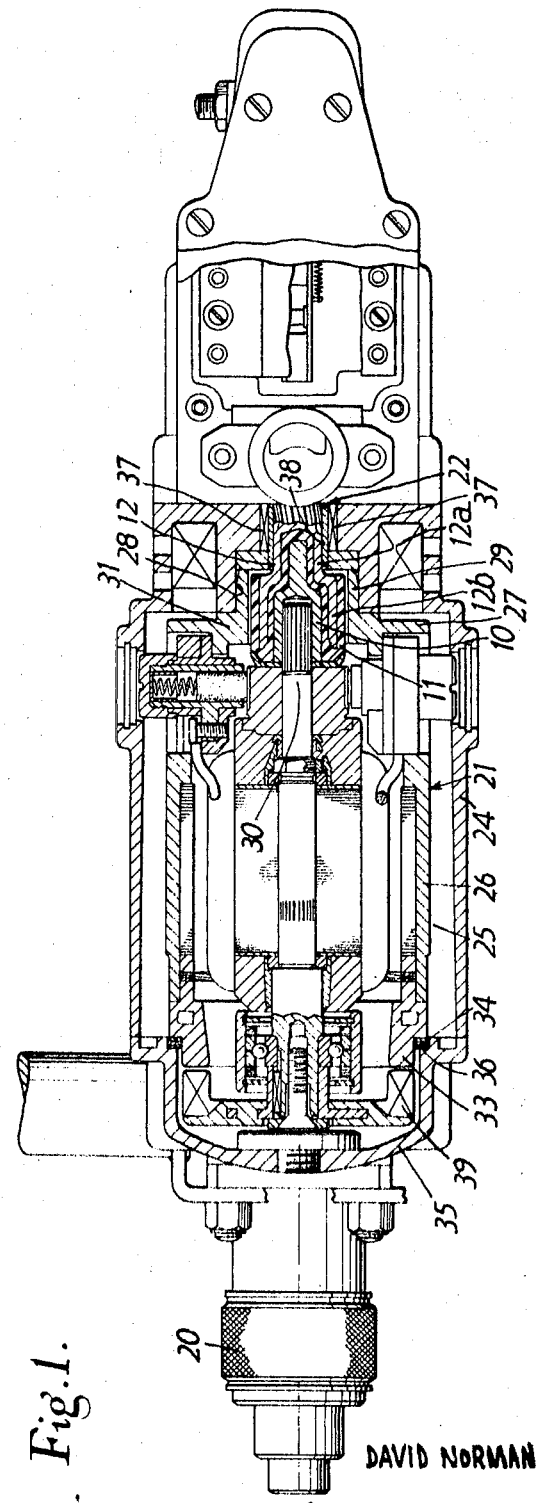
Figure 2:
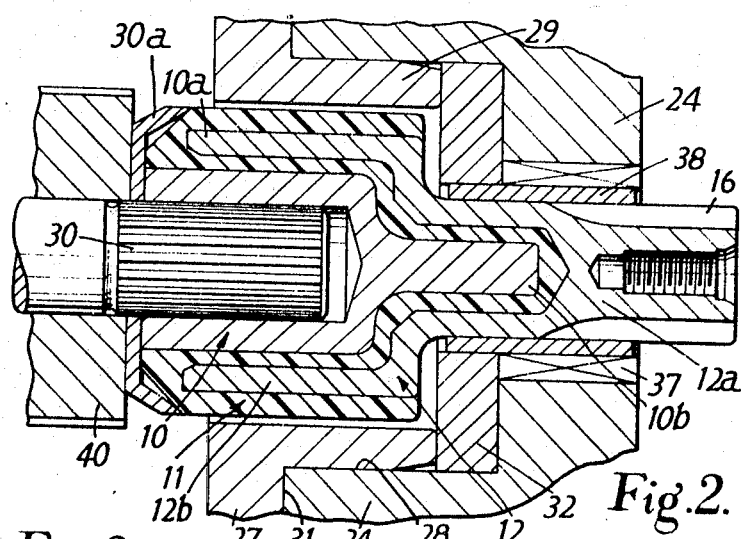
Figure 3:
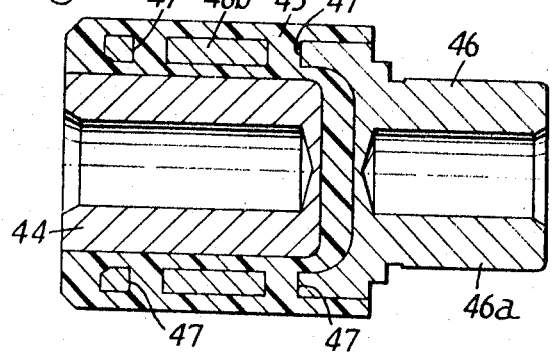
Figure 4:
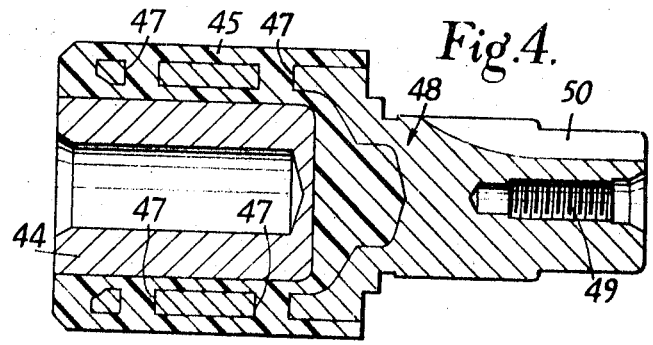

Some embodiments of the invention will now be described by way of example with reference to the accompanying drawings in which:

FIGURE 1 shows a part sectional view of a portable electrically driven power tool incorporating an electric motor according to the invention, FIGURE 2 shows an enlarged view of the coupling employed in the tool of FIGURE 1, and FIGURES 3 and 4 show respective modified forms of coupling.

Referring to FIGURE 1 of the drawings there is illustrated a portable percussive tool driven by an electric motor according to the invention. The bit or tool proper (not shown) is held in a tool retaining device 20 and has impacts transmitted to it in a direction lengthwise of itself by a crank and connecting rod mechanism through a pneumatic piston and cylinder arrangement in known manner, the crank shaft (not shown) being driven by the electric motor 21 through a coupling 22 and a reduction gear mechanism (not shown). The axes of the motor 21 and the tube holder are parallel to each other. The motor 21 forms a complete unit which is inserted into a compartment in the main housing 24 of the tool and is located against radial movement within the housing by six broad axially extending ribs 25 which are spaced apart from each other round the motor and engage the external surface of the motor casing 26. The complete external casing of the motor is made from an electrically insulating material such as glass-filled nylon.

At the coupling end, the motor has an end plate 27 formed with an axially projecting cylindrical portion 29 which is concentric with the output shaft 30 of the motor and which is in spigoted engagement with a recess 28 formed in the main housing 24. A sealing ring 32 is disposed axially between the motor casing portion 29 and the bottom of recess 28. A shoulder 31 on the end plate 27 abuts the main housing axially round the recess 28. At the opposite end of the motor the external casing of the motor includes an end member 33 with a reduced diameter portion encircled by a set of waved washers 34, and a cover plate 35 which forms part of the main housing 24 and which is detachable to allow the removal and re-insertion of the motor and which has an annular recess 36 in which the waved washers 34 engage, the bottom of this recess providing a seating surface for the washers so that the motor is urged resiliently lengthwise of itself to press the shoulder 31 firmly in engagement with the housing round recess 28.

Referring now also to FIGURE 2, the coupling 22 which is mounted on the output shaft 30 of the motor comprises three elements 10, 11 and 12. Element 10 has a main cup-shaped portion 10a the internal bore of which is of a diameter to form a press fit on a splined end portion of shaft 30, and an axially-projecting portion 10b. The outer peripheral surface of element 10 is coarsely knurled. Element 12 of the coupling comprises a shaft portion 12a and a sleeve portion 12b which encircles part of the axial length of the element 10. The shaft portion 12a is recessed from each end thereof, one of these recesses accommodating portion 10b of element 10 and the other recess being screw threaded. Elements 10 and 12 are not in contact with each other anywhere and element 11, which is made from a strong, electrically-insulating material is moulded round the sleeve portion 12b and the element 10. The material employed for making element 11 may for example be glass-filled nylon. Element 11 insulates elements 10 and 12 electrically from each other and is capable of transmitting the torsional forces between elements 10 and 12. The free end of portion 12a of element 12 is formed with gear teeth 16 which mesh with the input gear member of the reduction gear mechanism.

A shroud ring 30a made from an electrically insulating material is disposed on shaft 30 between commutator 40 and elements 10 and 11 of the coupling. Element 12 carries a hardened steel sleeve 38 which is an interference fit on the inner part of portion 12a and which engages bearing rollers 37 running on a race in the main housing 24. This bearing thus provides the support for the coupling end of shaft 30, no bearing being provided for this end of shaft 30 in the motor casing 26. Sleeve 38 also extends within the sealing ring 32 for shaft 30.

It will thus be seen that the coupling insulates the rotor electrically from the main housing 24, and, so far as the rotor is concerned, enables a construction to be provided which meets the double insulation requirements whilst employing only a single insulated rotor. In the construction illustrated, the opposite end of the rotor shaft 30 is supported by a bearing in the boss of the end member 33 and carries a fan 39 for drawing cooling air through the motor. Thus, since motor casing end member 33 is made from an electrically insulating material and since this end of the rotor does not contact the main housing 24, this end of the rotor does not need to be insulated from the housing. If, instead of driving a fan, the rotor shaft is required to drive a shaft or other rotary member mounted at its forward end in the housing, a coupling similar to any of those shown in FIGURES 2 to 4 is provided to couple the rotor shaft 30 to such other rotary member.

If a motor is used which has a metallic outer casing disposed in electrical contact with the metallic main housing 24 of the tool, then, to meet the requirements for double-insulation, insulating couplings are provided at both ends of the motor shaft. The second coupling is arranged in the same way as that shown in the drawings, so that the bearings for both ends of the motor shaft are supported by the main housing of the tool and are insulated from the motor shaft by the third elements of the two couplings, no bearings being provided in the motor casing for the motor shaft.

A modified form of coupling for the motor is shown in FIGURE 3. In this construction, elements 44, 45 and 46 correspond generally to elements 10, 11 and 12 respectively. Element 44 is cup-shaped and its bore is of a diameter to form an interference fit on shaft 30, the external surface of the element being coarsely knurled. Element 46 comprises a hollow shaft portion 46a and a sleeve portion 46b which encircles part of the axial length of element 44. Two rings of apertures 47 are formed in the sleeve portion, each ring comprising four apertures evenly spaced round the periphery of the sleeve portion. Shaft portion 46a has an internal blind bore which is of a diameter to form an interference fit on shaft to be driven by the motor. The external surface of portion 46a is cylindrical and is ground to a fine finish. Element 45 is made from a strong electrically-insulating material and is moulded about sleeve portion 46b and element 44, and fills the apertures 47. Apertures 47 serve to increase the power transmission capacity of the coupling. In applying this coupling to the arrangement shown in FIGURE 1, a gear member (not shown) for connection to the shaft 30 to drive the reduction gear mechanism has a stub shaft which is an interference fit in the bore of the shaft portion 46b. Also, a sleeve 38 is provided and is an interference fit on the external surface of the shaft portion 46b.

By comparison with the coupling shown in FIGURE 3, the coupling in FIGURE 2 has an improved resistance to flexure by virtue of the axially projecting portion 10b and the surrounding recess provided by the element 12.

The coupling illustrated in FIGURE 4 is similar to that shown in FIGURE 3 except that its output element 48 which corresponds to element 46 is elongated, and has a threaded bore 49 and external gear teeth 50. The threaded bore 49 is primarily provided for locating the element during the moulding of insulating element but also serves to assist removal of the coupling when required.

I claim:

1. An electric motor having an output shaft, and a coupling comprising a first element fixedly secured on one end of said shaft and a second element disposed coaxially with the first element and spaced therefrom, one of which elements has a sleeve portion encircling at least part of the axial length of the other element, and a third element which is made from an electrically insulating material and fills the gaps between the first and second elements and which is adapted to transmit a rotary drive from the first element to the second element whilst insulating the first and second elements electrically from each other.

2. A motor as claimed in claim 1, wherein the sleeve has holes extending radially therethrough which are filled by the material of the third element.

3. A motor as claimed in claim 1, wherein the external surface of the element or element part encircled by the sleeve portion is knurled.

4. A motor as claimed in claim 1, wherein the third element extends round the whole of the radially outer surface of the sleeve portion.

5. A motor as claimed in claim 1, wherein the first element has an axial bore, and wherein that portion of the output shaft which has the first element secured thereon is externally splined and is an interference fit in said axial bore in the first element.

6. A motor as claimed in claim 1, wherein said one of the elements has a shaft portion projecting axially away from the sleeve portion.

7. A motor as claimed in claim 6, wherein said shaft portion is hollow and said other element has an axial extension projecting into the interior of the hollow shaft portion, the third element filling the radial gap between the extension and the hollow shaft portion.

8. A motor as claimed in claim 1, and having on the other end of its output shaft a second coupling similar to the coupling on said one end.

9. A portable electrically driven power tool comprising a main casing carrying a tool holder and enclosing an electric motor as claimed in claim 1 for driving the tool holder through the coupling, wherein a bearing is mounted in said main casing and carries the second element, which bearing constitutes the only bearing for said one end of the output shaft of the motor, the motor having an external casing separate from said main casing through which external casing the coupling projects, and the external casing having a spigot mounting in the main casing of the power tool which spigot mounting encircles the coupling.

10. A portable electrically driven power tool comprising a main casing carrying a tool holder and enclosing an electric motor as claimed in claim 1 which motor has on the other end of its output shaft a second coupling similar to the coupling on said one end, said motor driving the tool holder through one of the couplings, wherein bearings are mounted in said main casing and carry the second elements of the two couplings respectively which bearings constitute the only bearings for said output shaft of the motor, the motor having an external casing separate from said main casing through which external casing the two couplings project, and the external casing having respective spigot mountings in the main casing of the tool, which mountings encircle the respective couplings.

References Cited

UNITED STATES PATENTS

| 3,119,942 | 1/1964 | Luther | 310—50 |
| 3,121,813 | 2/1964 | Pratt et al. | 310—50 |
| 3,225,230 | 12/1965 | Maffey | 310—50 |
| 3,344,291 | 9/1967 | Pratt | 310—50 |
| 3,413,498 | 11/1968 | Bowen et al. | 310—47 |

WARREN E. RAY, Primary Examiner

U.S. Cl. X.R.

310—75, 89